(12) United States Patent
Lin et al.

(10) Patent No.: US 6,566,860 B1
(45) Date of Patent: May 20, 2003

(54) METHOD FOR TEMPERATURE COMPENSATION FOR THE OUTPUT OF AN ANGULAR POSITION SENSOR

(75) Inventors: Yingjie Lin, El Paso, TX (US); Warren Baxter Nicholson, El Paso, TX (US); Esau Aguinaga, Chihuahua (MX)

(73) Assignee: Delphi Technologies, Inc., Troy, MN (US)

( * ) Notice: Subject to any disclaimer, the term of this patent is extended or adjusted under 35 U.S.C. 154(b) by 50 days.

(21) Appl. No.: 09/661,597

(22) Filed: Sep. 14, 2000

(51) Int. Cl.[7] .......................... G01R 33/02; G01B 7/30; H01L 43/06
(52) U.S. Cl. .............. 324/207.12; 324/207.2; 324/207.25
(58) Field of Search .............. 324/207.12, 207.2, 324/207.21, 207.25, 174; 702/85, 94, 104

(56) References Cited

U.S. PATENT DOCUMENTS

| | | | | |
|---|---|---|---|---|
| 3,728,565 A | * | 4/1973 | O'Callaghan ............... 310/168 |
| 4,746,859 A | * | 5/1988 | Malik .......................... 324/208 |
| 4,868,497 A | * | 9/1989 | Wallrafen .................... 324/160 |
| 5,130,650 A | * | 7/1992 | Lemarquand ........... 324/207.22 |
| 5,789,917 A | * | 8/1998 | Oudet et al. .............. 324/207.2 |
| 6,201,389 B1 | * | 3/2001 | Apel et al. ............... 324/207.2 |
| 6,229,299 B1 | * | 5/2001 | Strashny ..................... 324/174 |

* cited by examiner

Primary Examiner—Edward Lefkowitz
Assistant Examiner—Reena Aurora

(57) ABSTRACT

A method for compensating the output of an angular position sensor assembly includes placing a first magnetic field sensor such that it is oriented ninety degrees from a second magnetic field sensor. A magnet is placed so that it is equidistant from the sensors. The magnet is rotated, and as it rotates, the signals output by the sensors are sinusoidal waves that are out of phase with each other by ninety degrees (90°). Accordingly, the signals can be squared and summed to determined a temperature compensation signal.

7 Claims, 1 Drawing Sheet

METHOD FOR TEMPERATURE COMPENSATION FOR THE OUTPUT OF AN ANGULAR POSITION SENSOR

TECHNICAL FIELD

The present invention relates to angular position sensors.

BACKGROUND OF THE INVENTION

Power assisted steering is a standard motor vehicle equipment feature. It happens that in order for a typical power steering control system to properly operate, a steering column torque sensor must be included in the system to close the control loop. Torque sensors, such as resistance strip/strain gauge sensors, capacitance sensors, eddy-current sensors, magneto-elastic sensors, and transformer/strain gauge sensors, have been provided to determine the torque on the steering column. However, these sensors lack the sensitivity required for many of the present power steering control systems. Moreover, these sensors are extremely sensitive to changes in temperature and have limited durability.

Because of the high durability requirement, non-contact sensing technology is utilized. A typical non-contact sensor includes one or more magnetic field sensors, e.g., magnetoresistive sensors or Hall effect sensors, placed in proximity to a magnet, e.g., permanent or electrical. An electrical magnet provides constant magnetic field strength, but requires additional electronics that increase costs and the likelihood of sensor failure. On the other hand, a permanent magnet is simpler and more cost effective, but the field strength is very temperature dependent and can degrade over time.

The present invention understands that in order to compensate for temperature effects and degradation effects, linear Hall sensors can be used. Moreover, the present invention understands that a linear Hall sensor can be programmed with a temperature coefficient to match the temperature coefficient of a corresponding permanent magnet in order to compensate the sensor output for any effects caused by changes in temperature. Unfortunately, due to material variations in permanent magnets, programming a Hall sensor with a static temperature coefficient can result in the limited accuracy of the, e.g., angular position sensor in which the Hall sensor/permanent magnet configuration is used.

The present invention has recognized the above-mentioned prior art drawbacks, and has provided the below-disclosed solutions to one or more of the prior art deficiencies.

SUMMARY OF THE INVENTION

A method for temperature compensating the output of an angular position sensor includes providing at least two magnetic field sensors. A magnet is placed so that it is equidistant from the sensors. Thereafter, the magnet is rotated and outputs from the sensors are received. Based on the output from the sensors, a compensation signal is generated.

In a preferred embodiment, the compensation signal is sent to a control system. Preferably, the outputs of the sensors are ninety degrees out of phase with each other. In a preferred embodiment of the present invention, the compensation signal is generated by determining the square root of the sum of the squares of the outputs.

In another aspect of the present invention, an angular position sensor assembly includes a magnet. A first sensor and a second sensor are placed in proximity to the magnet. The first sensor provides a first output signal and the second sensor provides a second output signal that is ninety degrees out of phase with the first output signal. In this aspect of the present invention, a processor receives the output signals and generates a temperature compensation signal in response thereto.

The present invention will now be described, by way of example, with reference to the accompanying drawings, in which:

DESCRIPTION OF AN EMBODIMENT OF THE INVENTION

Figure 1:
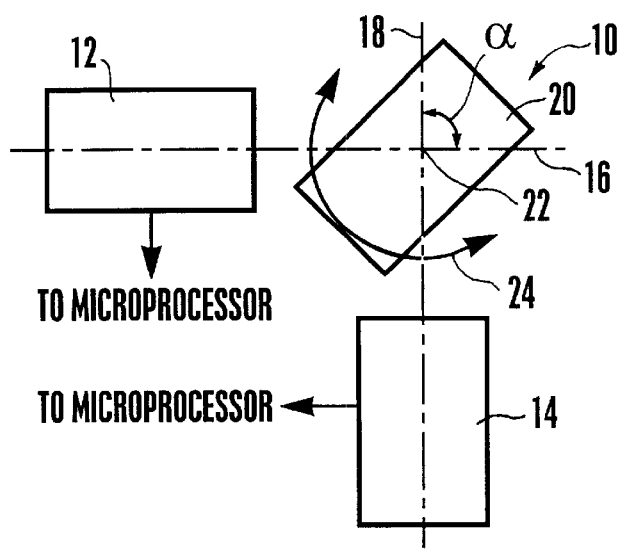
FIG. 1 is a block diagram representing an angular position sensor.

Referring initially to FIG. 1, an angular position sensor assembly is shown and generally designated 10. FIG. 1 shows that the angular position sensor includes a first magnetic field sensor 12, e.g., a Hall sensor, and a second magnetic field sensor 14, e.g., a Hall sensor. As shown in FIG. 1, the first sensor 12 defines an axis 16 and the second sensor 14 also defines an axis 18 that crosses the axis 16 of the first sensor 12 at an angle, a. Preferably, the angle, $a_1$ at which the axes 16, 18 cross is ninety degrees (90°).

FIG. 1 also shows a magnet 20, e.g., a permanent magnet, placed equidistant from both sensors 12, 14. The magnet 20 defines a center 22 that, in a preferred embodiment, is aligned with the point at which the axes 16, 18 cross. Preferably, the magnet 20 rotates in a clockwise direction, or counterclockwise direction with respect to the sensors 12, 14 as indicated by arc 24 in FIG. 1.

As intended by the present invention, as the magnet 20 rotates, the outputs from the sensor 12, 14 are sinusoidal waves that are out of phase with each other by ninety degrees (90°). As such, it can be considered that the waveform from one sensor, e.g., the first sensor 12, is a sine wave and the waveform from the remaining sensor, i.e., the second sensor 14 is a cosine wave. Moreover, since the change in magnetic field strength due to change in temperature affects both sensors 12, 14, the relative change due to temperature in amplitudes of the waveforms output by each sensor 12, 14 is the same. The sine and cosine waveforms have the following relationship:

$$(A \cdot \sin X)^2 + (A \cdot \cos X)^2 = A^2$$

Where:

A=field strength amplitude, and

X=measurement angle.

Figure 2:
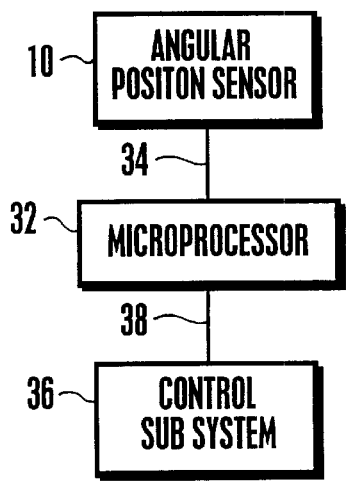
FIG. 2 is a block diagram representing a vehicle control system in which the current method can be employed.

Referring now to FIG. 2, a vehicle control system is shown and generally designated 30. FIG. 2 shows that the vehicle control system 30 includes the angular position sensor assembly 10, described above, electrically coupled to a microprocessor 32 via electrical line 34. In turn, the microprocessor 32 is electrically coupled to a subsystem 36 via electrical line 38. The formula disclosed above may be executed as a series of instructions by the microprocessor 32 in order to compensate the signal generated by the angular position sensor 10 for effects on the magnet 20 caused by temperature changes and degradation due to aging. These instructions may reside, for example, in RAM of the microprocessor 32, which, when programmed with the present logic, establishes a computer program product.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer executable instructions may be lines of compiled C++ compatible code. As yet another equivalent alternative, the logic can be embedded in an application specific integrated circuit (ASIC) chip or other electronic circuitry.

Figure 3:
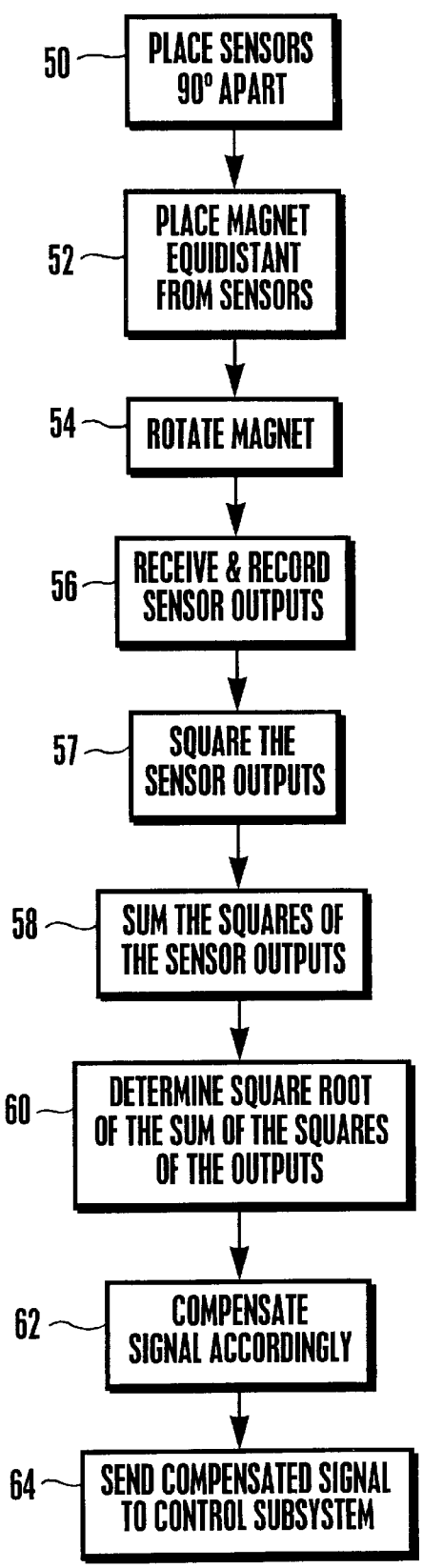
FIG. 3 is a flow chart showing the overall logic of the present invention.

Referring now to FIG. 3, the overall logic of the present invention can be seen. Commencing at block 50, the sensors 12, 14 are placed so that they are rotated ninety degrees (90°) relative to each other. At block 52, a magnet 20 is placed so that it is equidistant from the sensors 12, 14. Thereafter, at block 54, the magnet is rotated 20. Proceeding to block 56, the outputs from the sensors 12, 14 are received and recorded. Moving to block 57, the outputs from the sensors 12, 14 are squared. Thereafter, at block 58, the squares of the outputs from the sensors 12, 14 are added together. At block 60, the square root of this sum is determined. This value can be compared to a baseline value to determine how much and in what direction temperature has affected the sensors 12, 14. Based on the number determined at block 60, the output of the angular position sensor assembly 10 can be compensated accordingly at block 62. Thereafter, a compensated control signal can be sent to a control subsystem 36 at block 64.

With the configuration of structure described above, it is to be appreciated that the method to compensate the output of an angular position sensor provides a method that can be employed to dynamically compensate the output of an angular position sensor for effects caused by temperature and degradation.

While the particular METHOD TO COMPENSATE THE OUTPUT OF AN ANGULAR POSITION SENSOR as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A method for temperature compensating the output of an angular position sensor comprising the acts of:

providing at least two magnetic field sensors;

placing a magnet equidistant from the sensors;

rotating the magnet;

receiving outputs from the sensors; and based on the output from the sensors generating a compensation signal, the compensation signal being generated by determining the square root of the sum of the squares of the outputs.

2. The method of claim 1, further comprising the act of:

sending the compensation signal to a control system.

3. The method of claim 1, wherein the outputs of the sensors are out of phase with each other.

4. The method of claim 3, wherein the outputs are ninety degrees out of phase.

5. An angular position sensor assembly comprising:

a magnet;

at least a first sensor placed in proximity to the magnet, the first sensor providing at least a first output signal;

at least a second sensor placed in proximity to the magnet, the second sensor providing at least a second output signal that is ninety degrees out of phase with the first output signal; and a processor receiving the output signals, the processor including logic means for generating a temperature compensation signal in response to the output signals, the compensation signal being generated by determining the square root of the sum of the squares of the outputs.

6. The angular position sensor assembly of claim 5, wherein the magnet is rotated, the sensors are equidistant from the magnet.

7. The angular position sensor assembly of claim 6, wherein the first sensor defines an axis and the second sensor defines an axis that is perpendicular to the axis of the first sensor.

* * * * *